United States Patent
Yoo et al.

(10) Patent No.: US 12,488,510 B2
(45) Date of Patent: *Dec. 2, 2025

(54) ENCODERS FOR IMPROVED IMAGE DITHERING

(71) Applicant: Google LLC, Mountain View, CA (US)

(72) Inventors: Innfarn Yoo, Mountain View, CA (US); Xiyang Luo, Mountain View, CA (US); Feng Yang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,352

(22) Filed: Sep. 12, 2023

(65) Prior Publication Data

US 2024/0005563 A1 Jan. 4, 2024

Related U.S. Application Data

(63) Continuation of application No. 16/834,857, filed on Mar. 30, 2020, now Pat. No. 11,790,564.

(51) Int. Cl.
 *G06T 9/00* (2006.01)
 *G06N 3/084* (2023.01)
 (Continued)

(52) U.S. Cl.
 CPC ............. *G06T 9/002* (2013.01); *G06N 3/084* (2013.01); *G06N 20/00* (2019.01); *G06T 5/50* (2013.01);
 (Continued)

(58) Field of Classification Search
 CPC . G06T 9/002; G06T 5/50; G06T 2207/10024; G06T 2207/20212;
 (Continued)

(56) References Cited

U.S. PATENT DOCUMENTS 3,175,212 A * 3/1965 Miller ..................... H03M 1/42
 375/244
4,916,545 A * 4/1990 Granger ............... H04N 1/4058
 358/3.09
(Continued)

OTHER PUBLICATIONS

Dither—Wikipedia, https://en.wikipedia.org/wiki/Dither, 9 pages.
(Continued)

*Primary Examiner* — Charles T Shedrick
(74) *Attorney, Agent, or Firm* — McDonnell Boehnen Hulbert & Berghoff LLP

(57) ABSTRACT

Example embodiments allow for training of encoders (e.g., artificial neural networks (ANNs)) to facilitate dithering of images that have been subject to quantization in order to reduce the number of colors and/or size of the images. Such a trained encoder generates a dithering image from an input quantized image that can be combined, by addition or by some other process, with the quantized image to result in a dithered output image that exhibits reduced banding or is otherwise aesthetically improved relative to the un-dithered quantized image. The use of a trained encoder to facilitate dithering of quantized images allows the dithering to be performed in a known period of time using a known amount of memory, in contrast to alternative iterative dithering methods. Additionally, the trained encoder can be differentiable, allowing it to be part of a deep learning image processing pipeline or other machine learning pipeline.

16 Claims, 4 Drawing Sheets

(51) Int. Cl.
   *G06N 20/00*        (2019.01)
   *G06T 5/50*         (2006.01)

(52) U.S. Cl.
   CPC ............... *G06T 2207/10024* (2013.01); *G06T 2207/20212* (2013.01)

(58) Field of Classification Search
   CPC ...... G06N 3/084; G06N 20/00; G06N 3/0454; H04N 1/644; H04N 19/86
   See application file for complete search history.

(56) References Cited

U.S. PATENT DOCUMENTS

| | | | | |
|---|---|---|---|---|
| 5,239,597 | A * | 8/1993 | Chung | H04N 1/40075 382/233 |
| 5,719,955 | A * | 2/1998 | Mita | G06N 3/045 706/41 |
| 6,326,977 | B1 * | 12/2001 | Westerman | H04N 1/644 345/593 |
| 8,595,163 | B1 * | 11/2013 | Ellis | G06F 16/9558 706/20 |
| 9,886,733 | B2 * | 2/2018 | Adsumilli | H04N 1/2112 |
| 10,401,614 | B1 * | 9/2019 | Guntaka | G02B 26/005 |
| 2006/0120596 | A1 * | 6/2006 | Chien | G06T 9/002 348/E9.04 |
| 2008/0144975 | A1 * | 6/2008 | Shibaki | H04N 1/4072 382/299 |
| 2009/0225370 | A1 * | 9/2009 | Gotoh | H04N 1/6022 358/3.06 |
| 2010/0046804 | A1 * | 2/2010 | Gu | H04N 1/409 382/190 |
| 2012/0057077 | A1 * | 3/2012 | Choi | H04N 19/14 348/625 |
| 2012/0133992 | A1 * | 5/2012 | Hirano | H04N 1/6022 358/3.06 |
| 2012/0262475 | A1 * | 10/2012 | Frank | H04N 1/40075 345/597 |
| 2013/0046803 | A1 * | 2/2013 | Parmar | H04N 1/644 708/401 |
| 2013/0181435 | A1 * | 7/2013 | Hersch | B42D 25/29 348/E5.085 |
| 2013/0223728 | A1 * | 8/2013 | Yamada | H04N 1/644 382/163 |
| 2014/0168426 | A1 * | 6/2014 | Andres | B42D 25/405 358/3.06 |
| 2015/0070500 | A1 * | 3/2015 | Pflug | H04N 23/84 348/148 |
| 2015/0131131 | A1 * | 5/2015 | Fukunaga | H04N 1/00039 358/504 |
| 2016/0080712 | A1 * | 3/2016 | Daly | H04N 1/646 345/597 |
| 2016/0155031 | A1 * | 6/2016 | Igawa | H04N 1/4051 358/3.1 |
| 2016/0200137 | A1 * | 7/2016 | Walter | B44C 1/28 428/120 |
| 2016/0301934 | A1 * | 10/2016 | Su | H04N 19/30 |
| 2018/0261142 | A1 * | 9/2018 | Weng | G09G 5/04 |
| 2019/0251434 | A1 * | 8/2019 | Wu | G06N 3/063 |
| 2020/0218982 | A1 * | 7/2020 | Annau | G06F 7/49963 |
| 2021/0090276 | A1 * | 3/2021 | Kataoka | G06T 7/543 |
| 2022/0101493 | A1 * | 3/2022 | Kimura | G06N 3/08 |
| 2022/0148232 | A1 * | 5/2022 | Sollami | G06T 11/001 |
| 2023/0053317 | A1 * | 2/2023 | Luo | G06V 10/82 |

OTHER PUBLICATIONS

Floyd-Steinberg dithering—Wikipedia, https://en.wikipedia.org/wiki/Floyd%E2%80%93Steinberg_dithering, 2 pages.

Pang et al., "Structure-Aware Halftoning", ACM Transactions on Graphics, vol. 27, No. 3, Article 89, Aug. 208, 8 pages.

Chang et al., "Structure-Aware Error Diffusion", ACM Transactions on Graphics, vol. 28, No. 5, Article 162, Dec. 2009, 8 pages.

Wang et al., "A Perceptual Visibility Metric for Banding Artifacts", IEEE, 2016, pp. 2067-2071.

\* cited by examiner

ENCODERS FOR IMPROVED IMAGE DITHERING

CROSS-REFERENCE TO RELATED APPLICATION

This application claims priority to U.S. non-provisional application Ser. No. 16/834,857, filed Mar. 30, 2020, the disclosure of which is expressly incorporated by reference herein.

BACKGROUND

An image can be projected into a limited color space by being 'quantized.' Quantization can include translating each pixel of an input image to a respective color of a color palette that represents the limited color space, truncating or rounding a binary value representing each pixel (e.g., discarding the least significant bits of a value that represents the amount of blue or some other color channel of the pixel), and/or some other process. Quantization may be performed to reduce the file size of the image (e.g., to reduce the storage or bandwidth required to store, transmit, or otherwise use the image), to match the image to the properties of a display used to show the image (e.g., a display that is only capable of generating a limited set of colors), to reduce the computational resources required to render or otherwise interact with the image, or to provide some other benefit.

However, quantization of an image can result in artifacts that are aesthetically unpleasant. For example, smooth color gradients in an input image may be transformed by the quantization process into bands of flat color. The effect of these artifacts may be reduced by applying a process to spread the difference (or error) between the input image and the quantized image across a wider area of pixels within the quantized image. This can have the effect of, for example, softening the edges of bands of color that may result from quantization of a color gradient region within the input image. Such a spreading process may be referred to as dithering. Many dithering methods include a process of error diffusion, wherein the differences (or 'error') between pixels of an input image and corresponding pixels of the quantized output image are spread across neighboring pixels.

SUMMARY

In a first aspect, a method is provided that includes: (i) obtaining an input image and a color palette; (ii) generating, using the color palette, a first reduced-color image by projecting the input image into a color space represented by the color palette; (iii) applying the input image and the first reduced-color image to an encoder to generate a dithering image; and (iv) generating, using the color palette, a second reduced-color image by projecting a combination of the input image and the dithering image into the color space represented by the color palette.

In a further aspect, a method is provided that includes: (i) obtaining training data and a color palette, wherein the training data comprises one or more images, wherein each of the one or more images has a plurality of color channels; (ii) generating, using the color palette, a first reduced-color image by projecting a first image from the training data into a color space represented by the color palette; (iii) applying the first image and the first reduced-color image to an encoder to generate a dithering image; (iv) generating, using the color palette, a second reduced-color image by projecting a combination of the first image and the dithering image into the color space represented by the color palette; (v) determining an error signal, wherein determining the error signal comprises comparing the first image to the second reduced-color image; and (vi) updating the encoder based on the error signal.

In another aspect a non-transitory computer-readable medium is provided that has stored thereon program instructions that, upon execution by a computing device, cause the computing device to perform a method comprising: (i) obtaining an input image and a color palette; (ii) generating, using the color palette, a first reduced-color image by projecting the input image into a color space represented by the color palette; (iii) applying the input image and the first reduced-color image to an encoder to generate a dithering image; and (iv) generating, using the color palette, a second reduced-color image by projecting a combination of the input image and the dithering image into the color space represented by the color palette.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
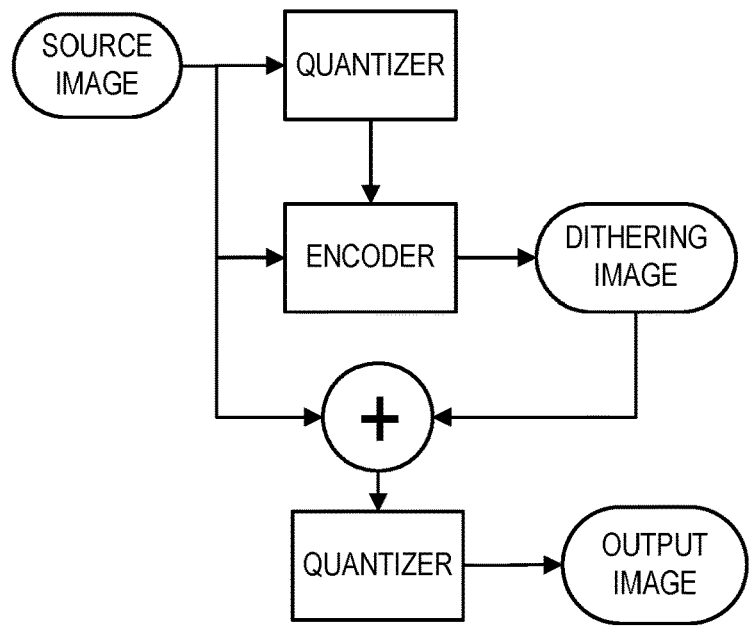
FIG. 1A illustrates an example method.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. Example Applications & Image Format Conversion

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

Different image formats have different numbers of distinct colors they can support. This may be related to how many bits are used to represent each pixel. For example, the Portable Network Graphics (PNG) format can store colors represented by 8, 16, 24, 32, 48, or 64 bits per pixel and/or 2, 3, 4, 6, 8, 10, 12, 16, or 32 bits per channel per pixel, while the Graphics Interchange Format (GIF) supports up to 8 bits per pixel. Thus, if an image is converted from one format to another, the color data may be converted so as to be supported by the new format. The format of an image file may be changed for website image embedding, file compression, or file transfer, or other reasons. This conversion can be a slow process, especially for large image files. Additionally, the conversion can lead to a loss in perceptual quality of the image. A variety of methods can be employed to generate the color palette used to quantize an image so as to improve the perceptual quality of the image following quantization. This can include applying the median cut algorithm, a trained artificial neural network (ANN), or some other algorithms to generate a predicted color palette from an image. This predicted color palette could then be used to generate the image in the specified file format.

The quantization process can result in perceptually unpleasant artifacts in the image. For example, conversion of the pixels of the input image into a restricted number of output colors can result in color banding or other artifactual edges in the quantized image. For example, a region containing a smooth color gradient in an input image may result in a small number of discrete bands of color in the quantized image. Such banding or other quantization-related image artifacts may be readily perceived (e.g., due to creating obvious edges or other features in the output image) and may result in significant negative impact on the perceptual quality of the output quantized image.

Banding or other quantization-related image artifacts may be related to the nonlinear nature of the quantization process, such that regions of gradual change in the input image are mapped to sudden changes in the quantized output image. Near an artifactual edge in the output image, the 'error' between the input pixels and the quantized output pixels is greatest. Accordingly, the perceptual effect of such edges, or other quantization-related artifacts, can be reduced by spreading this error across nearby pixels. This has the effect of transferring the spatial frequency content of the error from lower spatial frequencies to higher spatial frequencies, where the error is less perceptually evident. Such a process may be referred to as dithering.

A variety of dithering methods may be applied. Some dithering methods apply a process of error diffusion whereby the differences (or 'error') between pixels of an input image and corresponding pixels of the quantized output image are spread across neighboring pixels. The Floyd-Steinberg dithering algorithm is a popular example of an error-diffusing dithering method. In the Floyd-Steinberg dithering algorithm, the pixels of an input image are quantized sequentially and the quantization error from each pixel is applied to neighboring pixels prior to quantization of those pixels. To illustrate this process, a particular pixel $p_{[n,m]}$ of a grayscale image is quantized, and the difference between its quantized and un-quantized image value (or luminance) is e. In this example, n and m are the horizontal and vertical indices, respectively, of the pixel within the input and output images. The error e is then spread to neighboring pixels of the input image that have not yet been quantized. In the Floyd-Steinberg dithering algorithm, $e*7/16$ is added to pixel $p_{[n+1,m]}$, $e*3/16$ is added to pixel $p_{[n-1,m-1]}$, $e*5/16$ is added to pixel $p[n,m-1]$, and $e*1/16$ is added to pixel $p_{[n+1,m-1]}$. The process is applied iteratively and sequentially to each pixel in the input image as the pixels are quantized to generate corresponding pixels of the output image. Different error-diffusing dithering algorithms vary with respect to the pattern of error diffusion, the manner in which the error diffusion is applied to individual pixels of the input image (e.g., the ordering of application to pixels of the image), the addition of random or pseudo-random noise to the pixels, or other aspects.

However, many contemporary methods for dithering are iterative, highly serialized, non-differentiable, or otherwise unsuited to use in a deep learning image processing pipeline or other type of machine learning pipeline. Accordingly, it can be computationally expensive or otherwise difficult to train or co-train segmentation algorithms, color palette prediction algorithms, object identification algorithms, or other algorithms using machine learning methods when such dithering algorithms are part of the overall process being trained. Further, such iterative and/or highly serialized methods may be expensive with respect to time and/or computational resources, may be difficult to speed up by expanding the applied computational resources, or may exhibit other undesired properties.

The embodiments herein provide encoders and encoder training methods that can be used to dither images in a manner that is compatible with machine learning methods. These encoders can be end-to-end differentiable or otherwise configured to facilitate backpropagation or other machine learning processes through the encoders. Further, these encoders can be evaluated in constant, linear, or otherwise more tractable computational time relative to image resolution, are amenable to speedup by application of additional memory, processor cycles, or other computational resources, and exhibit other benefits relative to alternative dithering methods. Yet further, the provided encoders can be trained using perceptual metrics that directly evaluate the degree of banding or other aesthetic qualities of the output quantized image, allowing the encoders to be trained to satisfy explicitly stated perceptual objectives or other cost functions of interest.

II. Example Dithering Algorithms

As noted above, a variety of image processing processes (e.g., image compression, transcoding between different image formats) include a quantization process whereby the color or other image information of the individual pixels of an input image is projected into another color space. This process can include thresholding or truncating color values of the pixels (e.g., discarding the least significant bits of a value that represents a color channel of a pixel), selecting a color from a color palette for each of the pixels (e.g., by selecting for each pixel a respective color from the palette that is closest to the color of the respective pixel), or applying some other process to alter the image information of pixels. Thus, the pixels of an input image generally differ from corresponding pixels of a quantized output image. These differences may be referred to as 'error.'

This error may be distributed in a manner that results in perceptually unpleasant artifacts in the quantized output image (e.g., banding) that may be ameliorated by applying a dithering algorithm. As noted above, a variety of dithering techniques exist, including error diffusion techniques (like the Floyd-Steinberg algorithm) that act to convert the low spatial frequency contents of the error into higher, less perceptually evident spatial frequency bands. However, the previously available dithering algorithms were generally iterative, serial, or otherwise unsuited to the differentiation, backpropagation, or other techniques involved in a machine learning pipeline.

A variety of techniques are provided herein to use artificial neural networks, convolutional neural networks, decision forests, and/or other machine learning encoders to facilitate dithering of images. Such encoders have the benefit of being differentiable, such that they can be easily incorporated into a machine learning image processing pipeline. Additionally, such encoders can be trained to satisfy a variety of expressly specified constraints, e.g., constraints related to the presence of banding or other unwanted perceptual features in images generated using the encoders. Further, the training methods used can include deep learning methods, allowing the encoder to operate based on multiple levels of structure and/or organization (e.g., edges, gradients, identified object types) that may be present in an input image.

As an example of such an encoder, an artificial neural network (ANN) can be applied to perform dithering of an image. Such an ANN could be configured in a variety of ways. For example, the ANN could include two or more layers, could include units having linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the generation of predicted color palettes based on input images. The ANN could be or could include a convolutional neural network (CNN) to facilitate receiving image(s) as an input and/or generating image(s) as an output.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply nonlinear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a non-saturating activation function, a sigmoid function) to outputs of a higher layer. Fully connected layers of a CNN receive inputs from many or all of the neurons in one or more higher layers of the CNN. The outputs of neurons of one or more fully connected layers (e.g., a final layer of an ANN or CNN) could be used to determine the predicted color palette of areas of an input image (e.g., for each of the pixels of an input image) or for the image as a whole.

Neurons in a CNN can be organized according to corresponding dimensions of the input. For example, where the input is an image (a two-dimensional input, or a three-dimensional input where the color channels of the image are arranged along a third dimension), neurons of the CNN (e.g., of an input layer of the CNN, of a pooling layer of the CNN) could correspond to locations in the two-dimensional input image. Connections between neurons and/or filters in different layers of the CNN could be related to such locations. For example, a neuron in a convolutional layer of the CNN could receive an input that is based on a convolution of a filter with a portion of the input image, or with a portion of some other layer of the CNN, that is at a location proximate to the location of the convolutional-layer neuron. In another example, a neuron in a pooling layer of the CNN could receive inputs from neurons, in a layer higher than the pooling layer (e.g., in a convolutional layer, in a higher pooling layer), that have locations that are proximate to the location of the pooling-layer neuron.

An encoder as described herein could be trained to receive a variety of inputs and to generate a variety of outputs so as to facilitate dithering of target images. For example, an encoder could be trained to receive an already-quantized input image and to directly generate a dithered output image. However, such an encoder could be expensive with respect to the computational resources and/or the number of training images needed to train it. To reduce these costs, an encoder could receive both a non-quantized version of an input image and a quantized version of the input image and could generate, as an output, a dithering image that represents error to be applied to the input image. The error represented in the dithering image could then be combined with the un-quantized input image and the combined image quantized in order to generate a dithered, quantized output image. This arrangement allows the encoder to operate based on information about the underlying input image as well as information about the distribution of error in the image following quantization. Such an encoder has a variety of benefits, including reduced computational resources and number of training image samples needed to train the encoder and the encoder being applicable to a variety of different quantizers (e.g., different color palettes applied to input images) without requiring re-training.

FIG. 1A includes a flowchart illustrating the use of such an encoder ("ENCODER" in FIG. 1A). An input image ("SOURCE IMAGE") is quantized by a quantizer ("QUANTIZER"). This could include using a pre-specified color palette, determining a color palette from the input image, truncating the least significant bits of image values of pixels of the input image, or applying some other quantization process. The output of the quantizer (a quantized version of the input image) and the input image are then applied to the encoder. The encoder outputs a dithering image ("DITHERING IMAGE") that represents errors to be applied to the input image prior to quantization so as to reduce banding or other undesired perceptual artifacts caused by the quantization process. The dithering image is then combined with the input image ("+") to generate a combined image that is then applied to the quantizer to generate an output image ("OUTPUT IMAGE").

The dithering image could be a color image to be combined with a color input image, a grayscale image to be combined with a grayscale input image, or some other combination. For example, the dithering image could be a luminance image to be combined to each of the color channels of a color input image. Combining the dithering image with the input image could include a variety of processes. In some examples, combining the dithering image with the input image includes generating a pixel-wise sum of dithering image and the input image (i.e., determining, for each pixel of the combined image, a sum of each of the color channels of corresponding pixels from the dithering image and the input image). For example, a particular color channel of a particular pixel $c_{[n,m,c]}$ of a dithering image could equal $i_{[n,m,c]} + d_{[n,m,c]}$, where n and m are indices representing location of the pixel within the dithering image, c is an index representing the color channel, and i and d represent the input image and dithering image, respectively. Alternatively, combining the dithering image with the input image can include generating a pixel-wise difference between the dithering image and the input image (i.e., determining, for each pixel of the combined image, a difference between corresponding pixels from the dithering image and the input image).

The output of the encoder could be post-processed prior to being combined with the input image. For example, the output dithering image could be thresholded to reduce the magnitude of pixel values of the dithering image that may be artifactually high. In another example, all or portions of the output dithering image could be scaled (e.g., by being multiplied by a scaling factor, by being reduced or increased by a bias value) in order to ensure that the dithering image, or local portions thereof, are zero mean.

III. Example Training Methods

An encoder (e.g., that is part or all of a CNN and/or other variety of ANN) or other algorithm used to generate dithering images from quantized and un-quantized input images or to otherwise facilitate dithering as described herein can be trained to improve the quality of the dithered images generated thereby. This training can include iteratively or otherwise updating the encoder based on a set of training images.

Such training could include applying a particular training image and a quantized version thereof to the encoder, determining an output dithering image, generating an output image by quantizing a combination of the input image and the generated dithering image, and then determining an error signal based on a comparison between the generated output image and the input image. The encoder can then be updated (e.g., via backpropagation) based on the determined degree of correspondence.

Sets of images or other training image information could be acquired, as described herein, for a plurality of different scenes, perspectives, and/or colors thereof in order to generate a plurality of images for training an encoder. Sets of images or other image information used to train an encoder could be acquired in a variety of ways. In some examples, one or more images of the training set could be augmented to increase the variety of images and image types present in the set of training images. This can include intentionally adding noise, changing the color balance, introducing simulated scratches, streaks, or other imperfections, or introducing some other abnormalities into one or more of the training images.

Figure 1B:
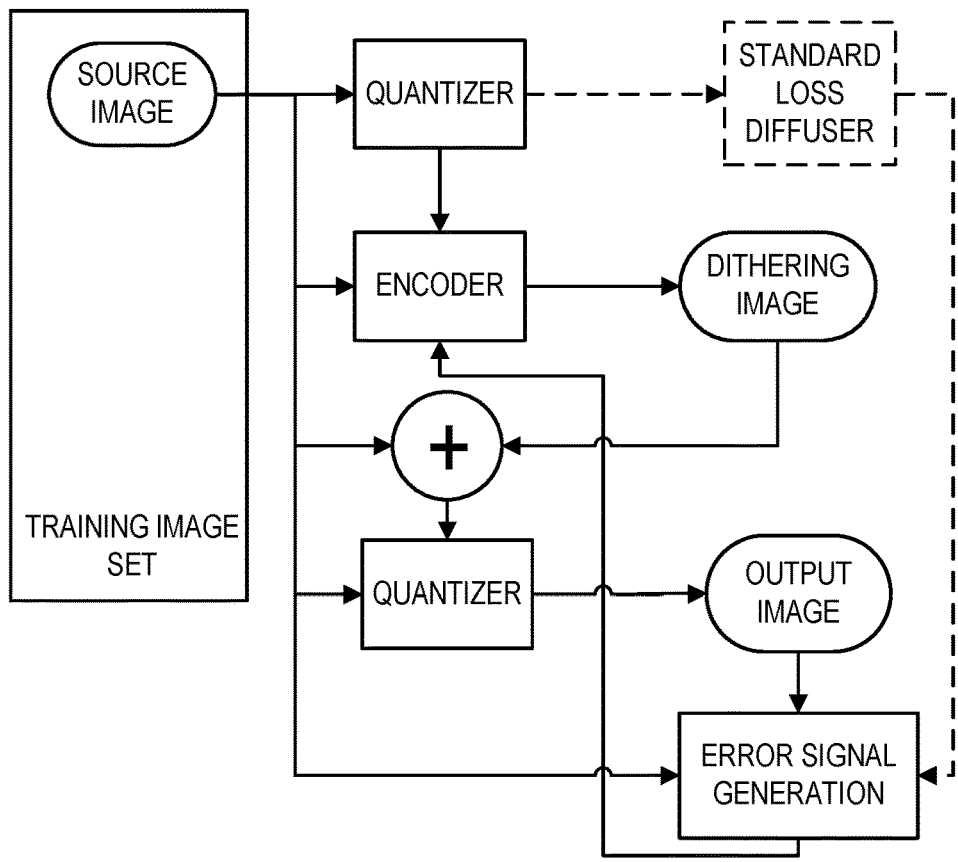
FIG. 1B illustrates an example method.

FIG. 1B shows an example flowchart illustrating elements of such an encoder training method. A plurality of images ("TRAINING IMAGE SET") includes an example source image ("SOURCE IMAGE").

An encoder ("ENCODER"), e.g., an ANN, a CNN, or some other encoder algorithm, is used to generate a dithering image ("DITHERING IMAGE") based on the source image and a quantized version thereof generated by a quantizer ("QUANTIZER"). The encoder could be configured in a variety of ways (e.g., as described above) to provide a dithering image based on an input image and a quantized version thereof. For example, the encoder could include a convolutional neural network. The dithering image is then combined with the source image (e.g., by performing a pixel-wise sum of or difference between the source image and the dithering image) and the combined image is then quantized to generate an output image ("OUTPUT IMAGE").

An error signal is generated based on a comparison of the output image and the source image ("ERROR SIGNAL GENERATION") and used to update the encoder. This is performed such that the encoder generates dithering images that, when combined with source images and then quantized, result in output images that accurately represent the input images. Such a comparison can include determining pixel-wise differences (e.g., a pixel-wise distance) between the source image and the output image. For example, a pixel-wise L1 distance between the source image and the output image could be determined and used to generate the error signal (e.g., by determining a sum of the differences between pixels of the output image and corresponding pixels of the source image). Additionally or alternatively, the error signal could be determined based on a pixel-wise L2 distance between the source image and the output image (e.g., the error signal could be a weighted combination of the L1 and L2 distances between the source image and the output image).

Updating the encoder can include applying the error signal to the determined differences between the output image and the source image, performing backpropagation, determining a gradient of the differences with respect to coefficients of the encoder, or updating the encoder, based on the error signal, according to some other method. In some examples, the error signal could include one or more terms related to a subjective quality of the quantized image. Such a subjective quality value could be provided, e.g., by a human who has viewed the quantized image. Additionally or alternatively, a convolutional neural network or other algorithm or model could be applied to the quantized image to generate such a subjective quality score. For example, the Neural Image Assessment (NIMA) could be applied to the quantized image to generate a subjective quality score.

Additionally or alternatively, the error signal could include one or more terms corresponding to a banding signal that is related to a degree of banding that is present in the output image (e.g., the error signal could be a weighted combination of such a banding signal and one or more terms generated based on a comparison between the output image and the source image). This may be performed such that the encoder generates dithering images that, when combined with source images and then quantized, result in output images that have reduced amounts of banding. Such a banding signal could be generated using a perceptual visibility metric for banding artifacts (e.g., a metric that detects the presence and degree of banding present in an image by, e.g., identifying edges in the output image that do not correspond to edges in the source image).

Additionally or alternatively, such a banding signal could be determined by comparing the output image to an image dithered according to a conventional dithering method (e.g., the Floyd-Steinberg dithering algorithm). For example, a conventional dithering method ("STANDARD LOSS DIFFUSER") could be applied to a quantized version of the source image to generate a conventionally dithered image, which is then compared to the output image in order to generate the error signal. Conventional dithering methods could include the Floyd-Steinberg dithering algorithm, random dithering, halftone dithering, minimized average error dithering, Stucki dithering, Burkes dithering, Sierra, dithering, Atkinson dithering, gradient-based error dithering, or some other conventional dithering method. Such a comparison could include determining pixel-wise differences between the output image and the conventionally dithered image (e.g., determining a pixel-wise L1 or L2 distance between the output image and the conventionally dithered image).

In order to prevent overfitting of the encoder to a particular conventional dithering method, the banding signal could be based on the outputs of multiple different conventional dithering methods. For example, the banding signal could be a weighted combination of the L2 distances (or some other distances, distance metrics, or combination thereof) between the output image and multiple different conventionally dithered images generated using respective different conventional dithering methods. Different conventional dithering methods could be wholly different methods (e.g., Floyd-Steinberg dithering and Sierra dithering) and/or could be different implementations of the same dithering method (e.g., applying Floyd-Steinberg dithering top-to-bottom and bottom-to-top).

The processes described above for updating an encoder (e.g., in connection with FIG. 1B) could be performed a plurality of times to train an encoder. For example, the processes could be performed iteratively until the encoder converges (e.g., until the degree of change in the encoder coefficients in each iteration reduces below a specified absolute or relative level), until a measure of the magnitude of the determined error signals (e.g., a sum of squared errors, a sum of rectified errors, subjective quality score) in each iteration reduces below a specified absolute or relative level, for a specified number of iterations, or according to some other condition.

Yet further, the embodiments described in connection with FIG. 1B are intended as illustrative example embodiments and are not intended to be limiting. For example, a plurality of images used to train an encoder could include a plurality of sets of images corresponding to respective different subjects. Each such set of images could include one or more all-in-focus images, shallow depth-of-field images, or other images that could be used to perform one or more elements of the encoder training methods described herein.

An encoder could be trained according to the techniques described herein by a server, cloud computing service, or other computing system. The system used to train the encoder could then apply the trained encoder to determine quantized, dithered images based on further source images. For example, the system could receive an additional image (e.g., from a cell phone, digital camera, or other image-capturing system) and apply the trained encoder to such an image to quantize and dither the image (e.g., as part of a process to compress the size of the images), or to perform some other operations related to the image. The system could then transmit the determined quantized, dithered version of the image, or other generated information to whatever device or system provided the additional image(s).

Additionally or alternatively, a server or other system could train an encoder as described herein and then transmit an indication of the trained encoder (e.g., an indication of the coefficients, internal structure, or other specifics of the trained encoder) to some other system. The other system could then operate to apply the trained encoder to additional images. For example, a server could train an encoder as described herein and then transmit an indication of the trained encoder to a cell phone (e.g., via the internet and/or a cellular data network). The cell phone could then operate to apply the trained encoder to images (e.g., images captured via a camera of the cell phone) to generate a quantized, dithered version of the images or to perform other processes using the trained encoder. Transmitting an indication of a trained encoder could include transmitting information, via wired or wireless components, to an already-operating system (e.g., to a cell phone, digital camera, or other device in communication with the internet). Additionally or alternatively, transmitting an indication of a trained encoder to a system could occur during assembly and/or programming of the system. For example, transmitting an indication of a trained encoder could include programming a controller or memory (e.g., a flash memory or some other non-transitory computer-readable medium) with the trained encoder and subsequently integrating the controller or memory into a device or other system.

Note that, while the images used to train encoder as described herein may be characterized as "training data" or "training images" used to train an encoder for later application to further images of interest (e.g., images captured by a cell phone), these characterizations are intended as non-limiting examples of the methods described herein. An ANN may be trained using one or more images and then used to quantize and dither the one or more images again, after it has been trained using the images.

IV. Illustrative Systems

Figure 2:
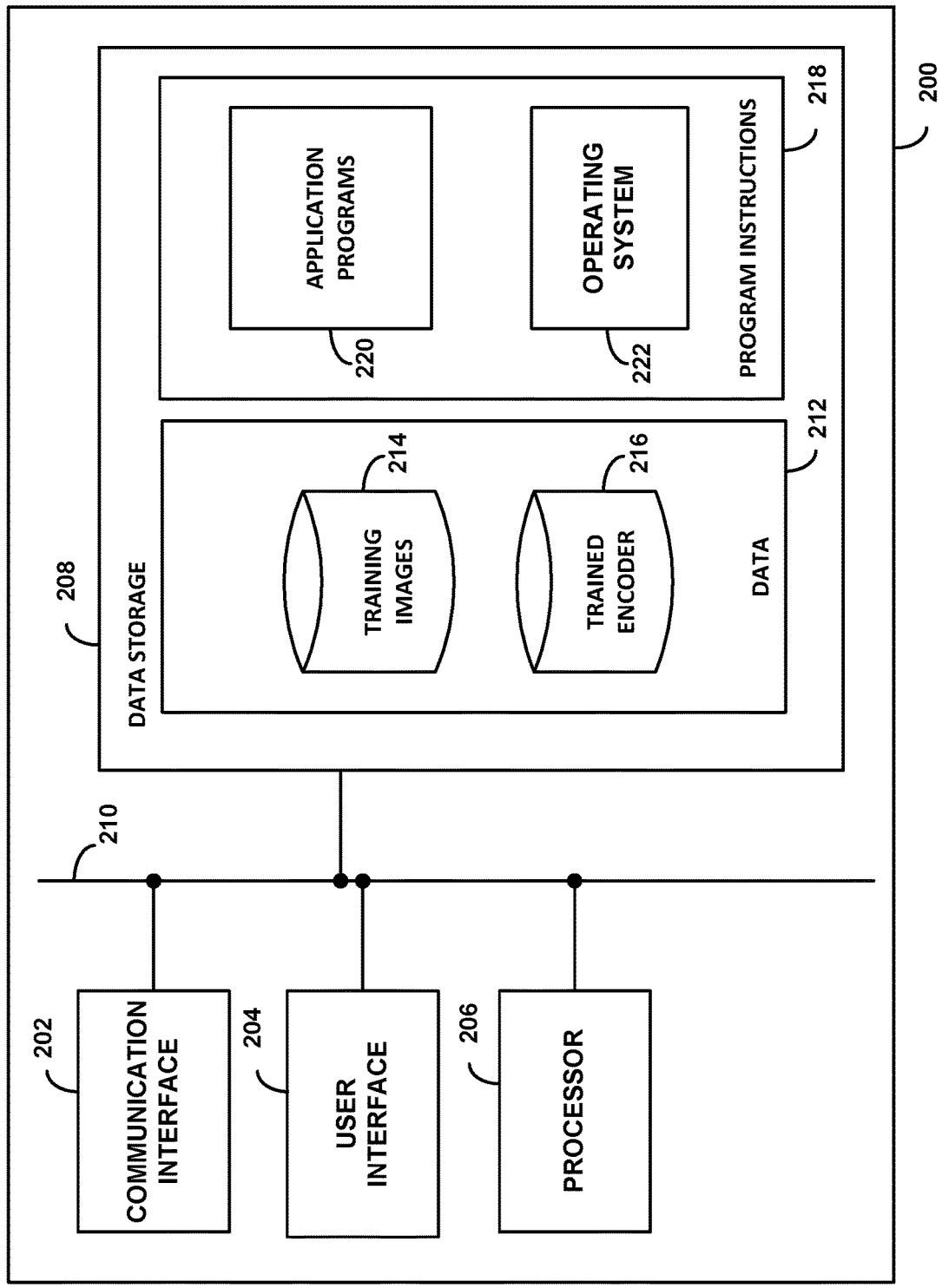
FIG. 2 is a simplified block diagram showing some of the components of an example computing system.

FIG. 2 illustrates an example computing device 200 that may be used to implement the methods described herein. By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device. Such a device may be equipped with an image capture device so as to generate one or more images that may then be compressed, quantized, and/or dithered according to the methods described herein (e.g., to generate an improved dithered quantized output image). It should be understood that computing device 200 may represent a physical camera device such as a digital camera, a particular physical hardware platform on which an image processing application operates in software, or other combinations of hardware and software that are configured to carry out image processing and/or encoder training functions.

As shown in FIG. 2, computing device 200 may include a communication interface 202, a user interface 204, a processor 206, and data storage 208, all of which may be communicatively linked together by a system bus, network, or other connection mechanism 210.

Communication interface 202 may function to allow computing device 200 to communicate, using analog or digital modulation of electric, magnetic, electromagnetic, optical, or other signals, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

In some embodiments, communication interface 202 may function to allow computing device 200 to communicate, with other devices, remote servers, access networks, and/or transport networks. For example, the communication interface 202 may function to access a trained encoder via communication with a remote server or other remote device or system in order to allow the computing device 200 to use the trained encoder to generate quantized images, color palettes, dithering images or other error spreading information, or other image information based on captured or otherwise obtained images and/or to use such information to dither or perform other image processing steps on such images. For example, the computing system 200 could be a cell phone, digital camera, or other image capturing device and the remote system could be a server containing a memory containing such a trained encoder.

User interface 204 may function to allow computing device 200 to interact with a user, for example to receive input from and/or to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

Processor 206 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, and merging images, among other applications or functions. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, encoder and/or ANN training, image-based color palette generation, image-based dithering image or other error spreading information generation) installed on computing device 200. Data 212 may include training images 214 and/or one or more trained encoders 216. Training images 214 may be used to train an ANN or other encoder or encoder-containing algorithm as described herein (e.g., to generate and/or update the trained encoder 216). The trained encoder 216 may be applied to generate dithering images or other error spreading information based on input images (e.g., quantized or otherwise reduced-color images captured using camera components of the device 200 and/or accessed via the communication interface 202).

Application programs 220 may communicate with operating system 222 through one or more application programming interfaces (APIs). These APIs may facilitate, for instance, application programs 220 reading and/or writing a trained encoder 216, transmitting or receiving information via communication interface 202, receiving and/or displaying information on user interface 204, capturing images using camera components 224, and so on.

Application programs 220 may take the form of "apps" that could be downloadable to computing device 200 through one or more online application stores or application markets (via, e.g., the communication interface 202). However, application programs can also be installed on computing device 200 in other ways, such as via a web browser or through a physical interface (e.g., a USB port) of the computing device 200.

V. Example Methods

Figure 3:
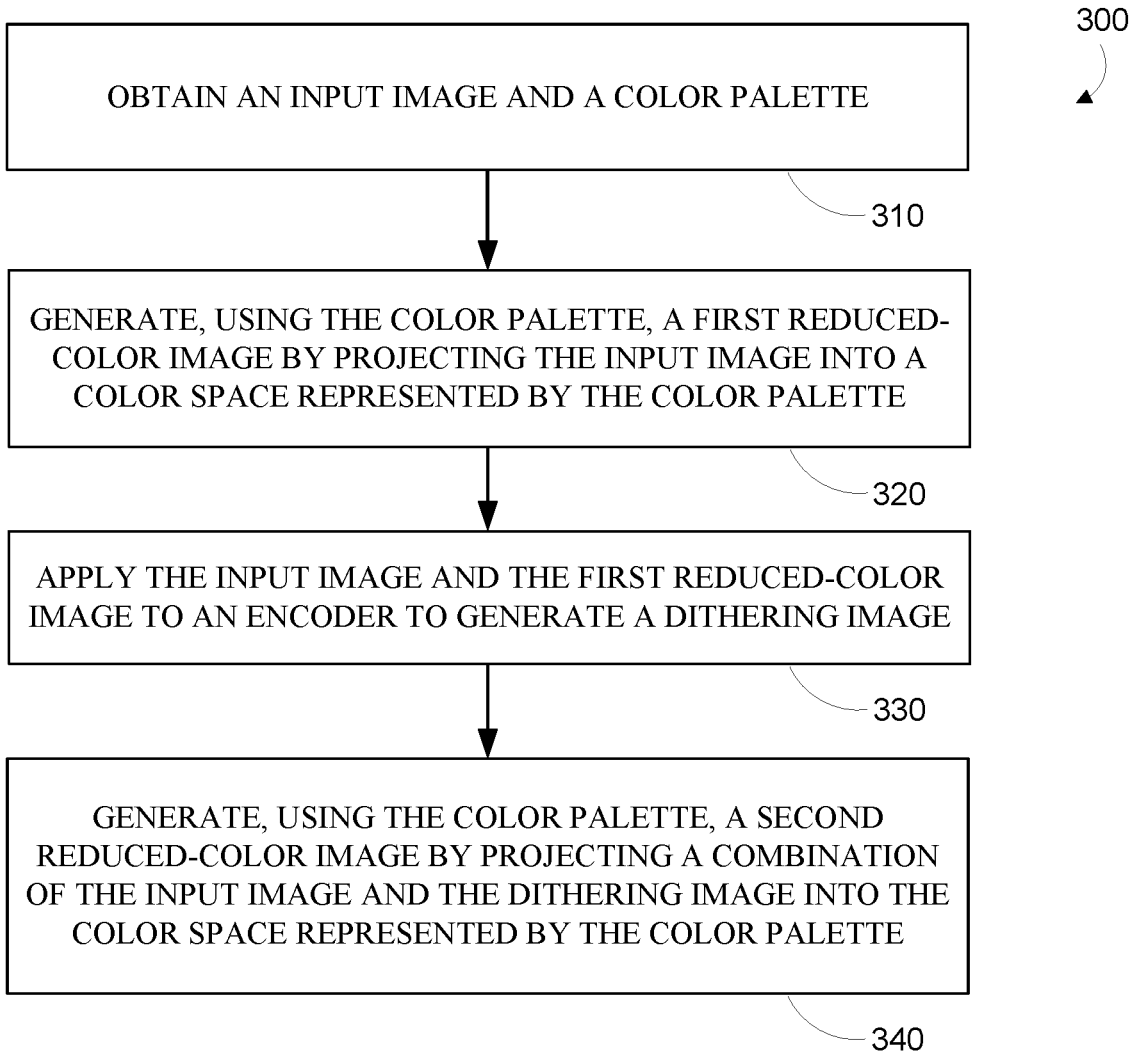
FIG. 3 is a flowchart of a method.

FIG. 3 is a flowchart of a method 300 for generating a dithered quantized image by using a trained encoder (e.g., an artificial neural network) to determine the pattern of dithering. The method 300 includes obtaining an input image and a color palette (310). The method 300 additionally includes generating, using the color palette, a first reduced-color image by projecting the input image into a color space represented by the color palette (320). The method 300 additionally includes applying the input image and the first reduced-color image to an encoder to generate a dithering image (330). The method 300 additionally includes generating, using the color palette, a second reduced-color image by projecting a combination of the input image and the dithering image into the color space represented by the color palette (340). The method 300 may include additional or alternative steps or features.

Figure 4:
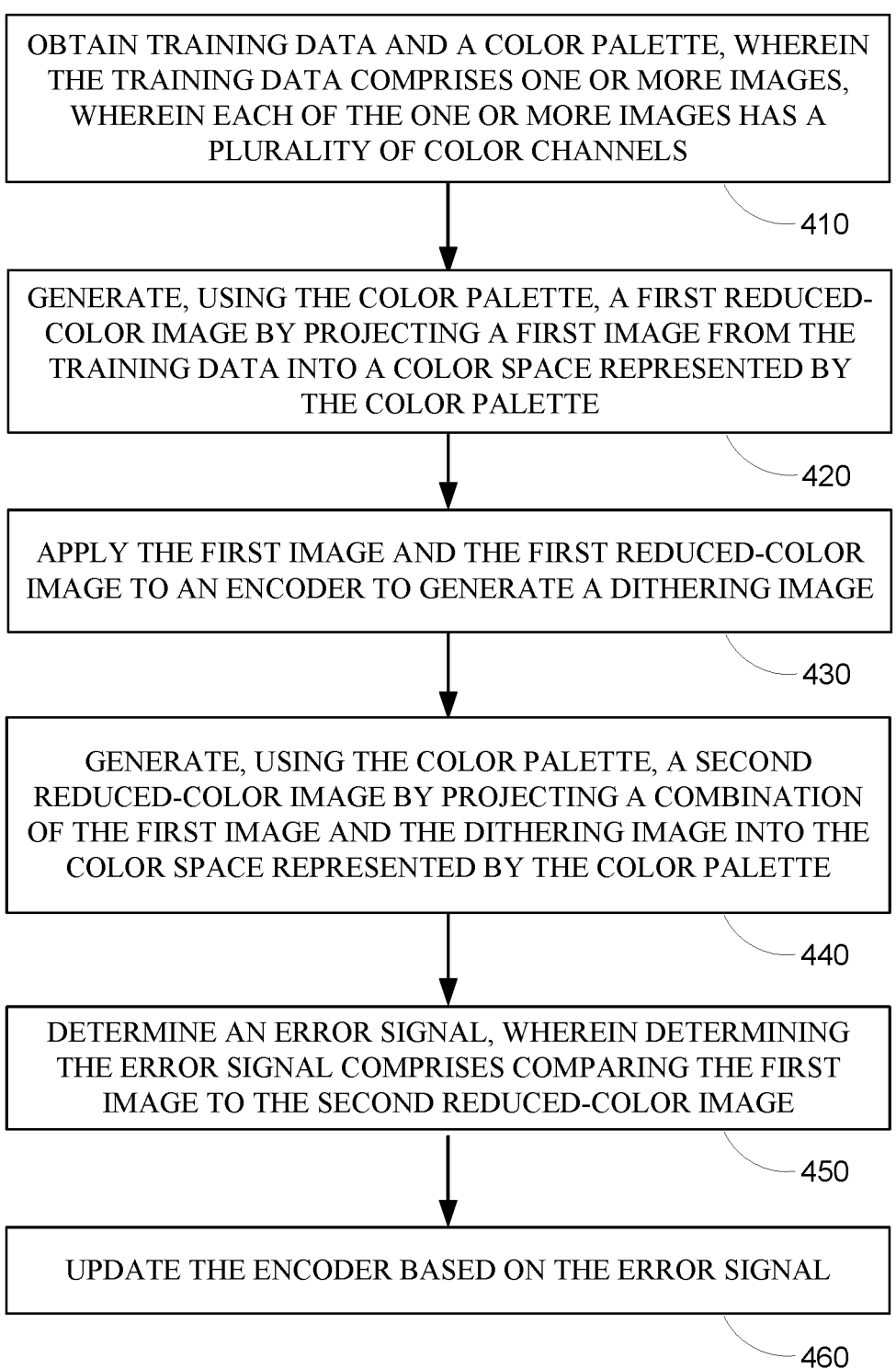
FIG. 4 is a flowchart of a method.

FIG. 4 is a flowchart of a method 400 for training an encoder to determine a pattern of dithering that can then be used to generate a dithered quantized image. The method 400 includes obtaining training data and a color palette, wherein the training data comprises one or more images, wherein each of the one or more images has a plurality of color channels (410). The method 400 additionally includes generating, using the color palette, a first reduced-color image by projecting a first image from the training data into a color space represented by the color palette (420). The method 400 additionally includes applying the first image and the first reduced-color image to an encoder to generate a dithering image (430). The method 400 additionally includes generating, using the color palette, a second reduced-color image by projecting a combination of the first image and the dithering image into the color space represented by the color palette (440). The method 400 additionally includes determining an error signal, wherein determining the error signal comprises comparing the first image to the second reduced-color image (450). The method 400 additionally includes updating the encoder based on the error signal (460). The method 400 may include additional or alternative steps or features.

VI. Conclusion

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

While example embodiments throughout have included the use of ANNs to generate, based on input images, error maps or other information to inform dithering or other error spreading methods, it is anticipated that alternative algorithms could be applied to generate error maps or related information or to otherwise implement dithering based on images. For example, kernel methods, Bayesian inferential algorithms, reinforcement learning algorithms, cellular automata, decision trees, boosted decision trees, or other alternative algorithms and/or combinations thereof could be applied, according to the methods described herein, to generate error maps or related information or to otherwise implement dithering based on input images. Correspondingly, the methods described herein for training ANNs could be applied to train such alternative algorithms, e.g., by providing error information that can be applied to update such alternative algorithms (e.g., using backpropagation, reinforcement learning, or some other technique appropriate for the chosen alternative algorithm).

We claim:

1. A method comprising:
   obtaining an input image and a color palette;
   generating, using the color palette, a first reduced-color image by projecting the input image into a color space represented by the color palette;
   applying the input image and the first reduced-color image to an encoder to generate a dithering image; and
   generating, using the color palette, a second reduced-color image by projecting a combination of the input image and the dithering image into the color space represented by the color palette.

2. The method of claim 1, wherein the image is an RGB image that has a red color channel, a blue color channel, and a green color channel.

3. The method of claim 1, wherein the encoder comprises a convolutional neural network.

4. The method of claim 1, wherein the combination of the input image and the dithering image is one of (i) a pixel-wise sum of the input image and the dithering image or (ii) a pixel-wise difference between the input image and the dithering image.

5. The method of claim 1, wherein projecting the input image into the color space represented by the color palette comprises selecting, for each pixel of the input image, a color from the color palette.

6. A method comprising:
   obtaining training data and a color palette, wherein the training data comprises one or more images, wherein each of the one or more images has a plurality of color channels;
   generating, using the color palette, a first reduced-color image by projecting a first image from the training data into a color space represented by the color palette;
   applying the first image and the first reduced-color image to an encoder to generate a dithering image;
   generating, using the color palette, a second reduced-color image by projecting a combination of the first image and the dithering image into the color space represented by the color palette;
   determining an error signal, wherein determining the error signal comprises comparing the first image to the second reduced-color image; and
   updating the encoder based on the error signal.

7. The method of claim 6, wherein the encoder comprises a convolutional neural network.

8. The method of claim 6, wherein the combination of the first image and the dithering image is one of (i) a pixel-wise sum of the first image and the dithering image or (ii) a pixel-wise difference between the first image and the dithering image.

9. The method of claim 6, wherein projecting the first image into the color space represented by the color palette comprises selecting, for each pixel of the first image, a color from the color palette.

10. The method of claim 6, wherein comparing the first image to the second reduced-color image comprises determining a pixel-wise L1 distance between the first image and the second reduced-color image.

11. The method of claim 6, wherein the encoder is differentiable end-to-end and wherein updating the encoder comprises performing backpropagation through the encoder.

12. A non-transitory computer-readable medium, having stored thereon program instructions that, upon execution by a computing device, cause the computing device to perform a method comprising:
obtaining an input image and a color palette;
generating, using the color palette, a first reduced-color image by projecting the input image into a color space represented by the color palette;
applying the input image and the first reduced-color image to an encoder to generate a dithering image; and
generating, using the color palette, a second reduced-color image by projecting a combination of the input image and the dithering image into the color space represented by the color palette.

13. The non-transitory computer-readable medium of claim 12, wherein the image is an RGB image that has a red color channel, a blue color channel, and a green color channel.

14. The non-transitory computer-readable medium of claim 12, wherein the encoder comprises a convolutional neural network.

15. The non-transitory computer-readable medium of claim 12, wherein the combination of the input image and the dithering image is one of (i) a pixel-wise sum of the input image and the dithering image or (ii) a pixel-wise difference between the input image and the dithering image.

16. The non-transitory computer-readable medium of claim 12, wherein projecting the input image into the color space represented by the color palette comprises selecting, for each pixel of the input image, a color from the color palette.

* * * * *